April 22, 1969 G. BACHER ET AL 3,439,987
ARRANGEMENT FOR MEASURING OF ANGLES, ESPECIALLY FOR MEASURING
THE ANGULAR POSITION OF WHEELS OF A MOTOR VEHICLE
Filed Aug. 18, 1965

INVENTORS
Gottlob Bacher
Siegfried Fehrenbach by Michael J. Striker

April 22, 1969   G. BACHER ET AL   3,439,987
ARRANGEMENT FOR MEASURING OF ANGLES, ESPECIALLY FOR MEASURING
THE ANGULAR POSITION OF WHEELS OF A MOTOR VEHICLE
Filed Aug. 18, 1965 prior art

INVENTORS
Gottlob Bacher
Siegfried Fehrenbach by
Michael S. Striker
Attorney

FIG. 11

| Wheel position | left | right |
|---|---|---|
| 20° | adjust caster | read toe in |
| 20° | read toe in | adjust caster |
| 20° | read caster | — |
| 20° | — | read caster |

FIG. 12

| Wheel position | left | right |
|---|---|---|
| 20° | adjust caster | read toe in |
| 20° | — | adjust caster |
| 20° | read toe in | read caster |
| 20° | read caster | — |

United States Patent Office
3,439,987
Patented Apr. 22, 1969

3,439,987
ARRANGEMENT FOR MEASURING OF ANGLES, ESPECIALLY FOR MEASURING THE ANGULAR POSITION OF WHEELS OF A MOTOR VEHICLE
Gottlob Bacher, Stuttgart-Weilimdorf, and Siegfried Fehrenbach, Stuttgart-Botnang, Germany, assignors to Robert Bosch G.m.b.H., Stuttgart, Germany
Filed Aug. 18, 1965, Ser. No. 480,681
Claims priority, application Germany, Aug. 19, 1964, B 78,169
Int. Cl. G01b 11/275; G01c 15/12
U.S. Cl. 356—155     10 Claims

ABSTRACT OF THE DISCLOSURE

An arrangement for measuring the angular position of wheels of a motor vehicle. The arrangement includes at least one mirror arranged substantially normal to the wheel axis on each wheel to be checked, a pair of oppositely disposed projectors for projecting light rays in the direction of the mirror and including a scale and a reticle in the path of the light rays, and a screen plate arranged to receive the light rays reflected from the mirror and provided with coordinates.

---

The present invention relates to an arrangement for measuring of angles, especially for measuring the angular position of wheels of a motor vehicle. The arrangement includes at least one mirror attached in a position normal to the wheel axis to each wheel to be checked, a light source arranged spaced from the mirror which projects, through optical means, light rays onto the mirror which in turn reflects the light rays back onto a screen plate provided with coordinates, and in which a scale and reticle are located in the path of the light rays so that the images of the scale will be reflected by the mirror onto the screen plate depending on the angular positions of the wheel carrying the mirror. Optical wheel aligners of this type are known in which the reticle is arranged in the path of the light rays between the light source and the mirror on the wheel and in which the scale is arranged in the path of the light rays between the wheel mirror and the screen plate. In this arrangement the images of the reticle and the scale are projected superimposed upon each other on the screen plate. In another known arrangement, the scale on a screen plate is brought in relationship to a rectile of a microscope.

These known arrangements require relatively large apparatus having components projecting to a considerable extent to the side of the apparatus which will necessarily result in an inaccuracy of the measurements, or an arrangement of the measuring instruments on fixed rails adjacent the vehicle to be checked. In addition, the known apparatus necessarily require an adjustment of the optical means thereof, so that the exactness of the measurements will depend on the exactness of the adjustment of the optical means.

It is an object of the present invention, to provide for an arrangement of the aforementioned type which avoids the disadvantages of known arrangements of this type.

It is an additional object of the present invention to provide for an arrangement of this type which includes a relatively light and transportable apparatus cooperating with the mirror on the wheel to be checked and which can be quickly and easily placed and adjusted on any substantially plane floor on which the vehicle to be checked is supported.

With these objects in view, the arrangement according to the present invention for measuring of angles, especially for measuring the angular position of wheels of a motor vehicle, mainly comprises at least one mirror on each wheel to be checked extending substantially normal to the axis of the respective wheel, a light source, optical means arranged in the path of light rays emanating from the light source for projecting the light rays onto the mirror, a screen plate arranged to receive the light rays reflected from the mirror and provided with coordinates, a scale and a reticle located between the light source and the mirror in the path of the light rays projected by the optical means onto the mirror so that the image of the scale will be reflected by the mirror onto the screen plate depending on the angular position of the wheel carrying the mirror.

In a preferred arrangement, the aforementioned optical means includes a set of condenser lenses and a set of objective lenses of preferably short focal length and in which the light source, the set of condenser lenses, the scale, the reticle as well as the set of objective lenses are arranged in the aforementioned sequence along a common optical axis as a portable projector in a single housing on one wall of which the screen plate is arranged which has at the intersection of its coordinates a central aperture for the passage of the light rays amanating from the set of objective lenses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 9A:
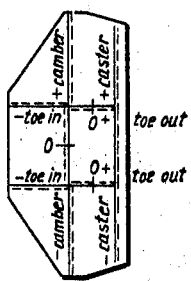
Figure 9B:
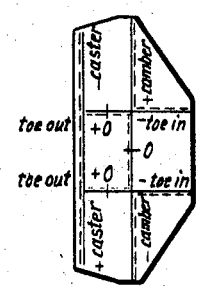
Figure 10A:
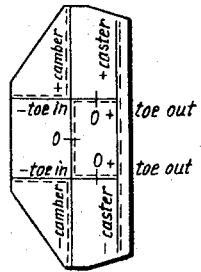
Figure 10B:
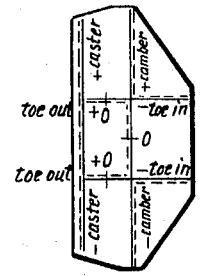

FIGS. 9a and 9b respectively illustrate the scales of projectors to be used for the right and the left wheels of a vehicle;

FIGS. 10a and 10b respectively illustrate the scales according to the prior art; and FIGS. 11 and 12 respectively illustrate successive steps during checking and adjusting the wheels of a vehicle, with the scales according of the apparatus of the prior art and with the scales according to the apparatus of the present invention.

Figure 1:
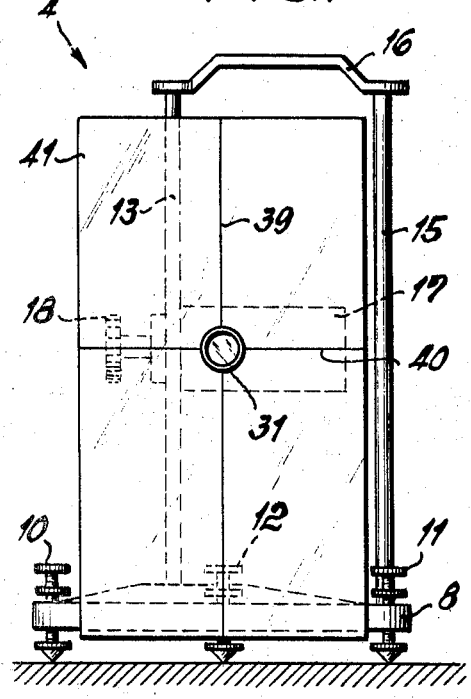
FIG. 1 is a front view of one of two apparatus necessary for measuring the angular position of two wheels on one vehicle axle.
Figure 2:
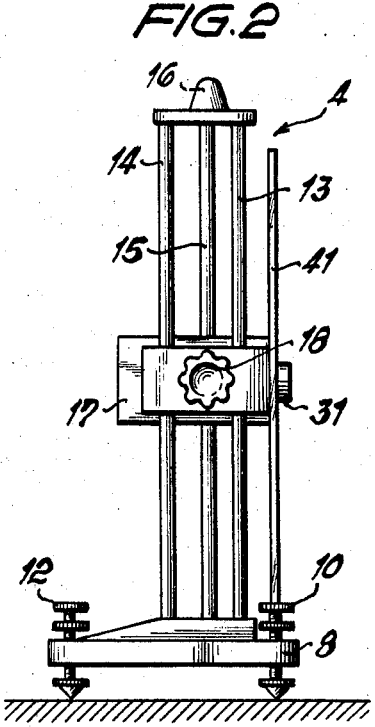
FIG. 2 is a side view of the apparatus shown in FIG. 1.
Figure 3:
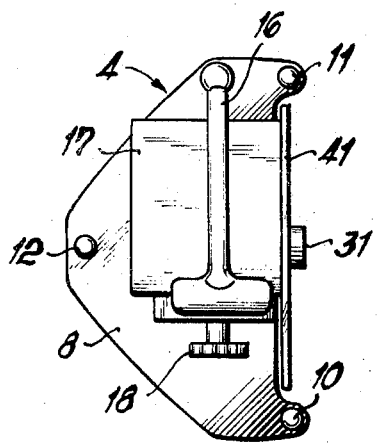
FIG. 3 is a top view of the apparatus shown in FIG. 1.
Figure 6:
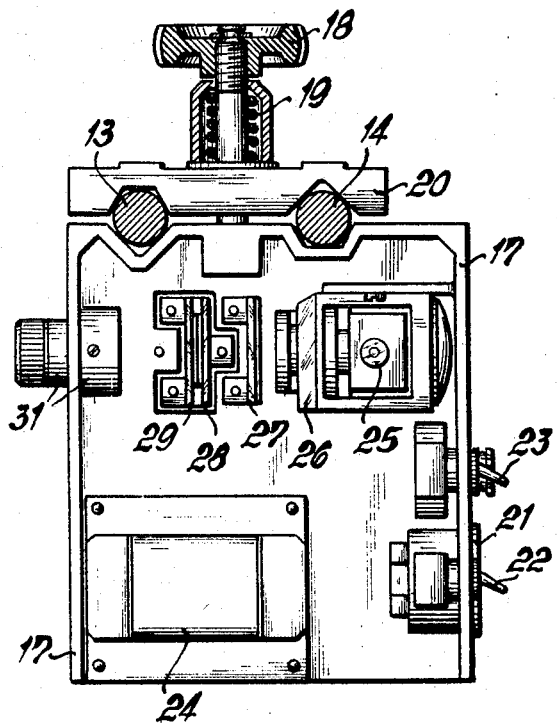
FIG. 6 is a schematic cross-section through one projector according to the present invention, drawn to a larger scale than in the preceding figures.

Referring now to the drawings, and more specifically to FIGS. 1–3 of the same, it will be seen that the measuring apparatus or projector 4, according to the present invention, comprises a base plate 8 having three adjusting screws 10, 11 and 12, by means of which the base plate may be adjusted to extend parallel to a floor on which a vehicle, the wheels of which have to be checked, is to be supported. Upright support means including a pair of support columns 13 and 14 project upwardly from the base plate 8 substantially normal thereto. A third column 15 also projects upwardly from the base plate 8 parallel to the aforementioned columns 13 and 14 and handle means 16 are connected to the upper free ends of the three columns for carrying the apparatus. A housing 17 is supported on the support columns 13 and 14, adjustable in longitudinal direction of the latter, as best shown in FIG. 6. As can be seen from FIG. 6, one wall of the housing 17 is provided with a pair of spaced V-grooves respectively partly surrounding the support columns 13 and 14 on one side there of, whereas a plate 20 formed with corresponding grooves is located at the opposite sides of the columns 13 and 14 and is pressed towards the aforementioned wall of the housing by means of wheel 18 threaded onto a stud fixed to the aforementioned wall of the housing and projecting through an opening through the plate 20, and a spring 19 sandwiched between the wheel 18 and the outer surface of the plate 20. The spring 19 is pretensioned in such a manner so as to provide a friction force substantially equal to the weight of the housing 17 and the components carried thereby so that the housing will no slide down on the columns 13 and 14, even if the wheel 18 is loosened.

The housing 17 carries an electrical socket 21 for connecting the electric components carried by the housing to a network, a network switch 22, a selector switch 23, a transformer 24 and a lamp 25, which is preferably in the form of an iodine vapor lamp, connected in circuit with the aforementioned electrical components in a manner as will be described later on in detail. The conductors connecting the various electrical components are not shown in FIG. 6. The housing 17 carries further optical components including a set of condenser lenses 26, forwardly of the lamp 25, a heat conductive transparent protector plate 27, a glass plate 28 provided with a scale, an additional glass plate 29 with a reticle, and a set of objective lenses 31, which are fixed connected in a non-adjustable manner to a front wall of the housing 17, extending through an opening thereof. The objective lenses have a short focal length in the order of 45 to 50 mm. so as to be adapted to project a sharp image of the scale and the reticle at a relatively large distance. Instead of providing two separate plates for the scale and the reticle, a simple heavy glass plate may be used provided on opposite faces thereof with the scale and the reticle.

Figure 7:
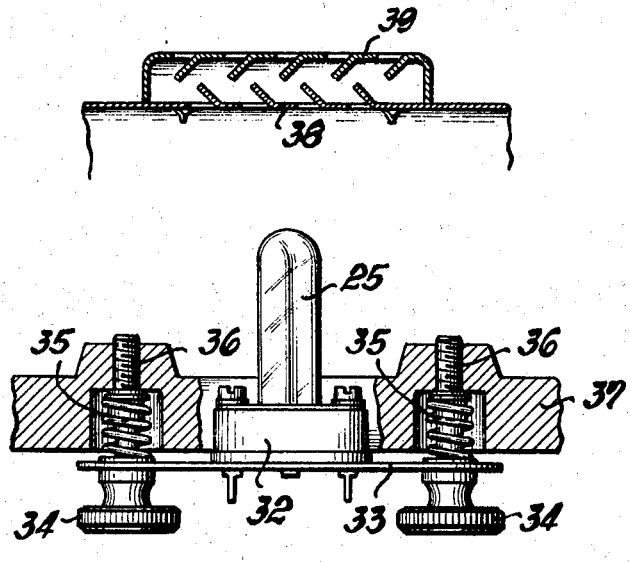
FIG. 7 is a cross-section, drawn to a further enlarged scale, of the arrangement of the light source in the housing and of louver means above the light source.

The socket 32 of the lamp 25 is mounted on a mounting plate 33, the position of which is adjustable by means of two head screws 34. The stem of each head screw 34 extends through an appropriate opening in the mounting plate 33 and the threaded end 36 of each head screw is threaded into correspondingly threaded bores of a cross beam 37, only partly shown in FIG. 7, which extends transversely through the housing 17 and which is fixedly connected at opposite ends thereof to the housing. A spring 35 is located about the stem of each screw 34, abutting with opposite ends thereof against the cross beam 37, and the mounting plate 33, respectively, and each spring 35 is biased to press the mounting plate 33 against the head of the respective head screw 34, so that the position of the lamp 25 may be adjusted by screwing the screws 34 in or out of the threaded bores of the cross beam 37. A louver means is provided in the top wall of the housing above the lamp 25, so that the heat produced by the transformer 24 and the lamp 25 may escape from the interior of the housing. The louver means include, as shown in FIG. 7, two sets of strips 38 and 39 superimposed upon each other, with the set of strips 38 inclined in a direction opposite to the direction of inclination of the set of strips 39 and offset with respect thereto, so that hot air may escape through the openings in the housing wall adjacent to the inclined strips 38 and 39, while at the same time light rays emanating from the lamp 25 are prevented to pass through the openings to the exterior of the housing.

Fixed to the front wall of the housing 17, through which the set of objective lenses 31 projects, is a screen plate 41 provided with coordinates 39 and 40 in such a manner that the outer surface of the screen plate 41 is normal to the base plate 8. The screen plate is provided at the intersection of the coordinates 39 and 40 with an aperture through which the outer end of the set of objective lenses 31 projects and the intersection of the coordinates is located on the optical axis along which the optical means of the projector, that is the two sets of lenses as well as the scale and the reticle are arranged. The adjusting screws 10 and 11 of the base plate 8 are preferably arranged in a plane parallel to the plane of the screen plate 41, and preferably slightly forwardly of the latter, whereas the third adjusting screw 12 is located rearwardly of the screen plate 41 so that by properly adjusting the aforementioned adjusting screws the screen plate 41 may be adjusted to extend in a vertical position.

When the wheels on one axle of a vehicle have to be checked, respectively aligned, the two therefore necessary projectors 4 have to be placed and be substantially aligned in direction of the axle of the vehicle to be driven between the two projectors. This necessary alignment can be carried out with the apparatus of the present invention in an exceedingly simple manner. For this purpose, two projectors 4 according to the present invention are placed opposite from each other so that the screen plates 41 of the two projectors face each other. The distance between the front faces of the screen plates is preferably chosen between 3,200 to 3,600 mm. since the reticle 29 is arranged in the projector according to the present invention such distance from the set of objective lenses 31 that the image of the reticle projected by the light source of one projector onto the screen plate 41 of the projector opposite thereto will be perfectly sharp within the aforementioned distance of the screen plates 41 from each other. The aforementioned distance of the two screen plates 41 from each other is also sufficient so that any known types of motor vehicles can be moved between the screen plates.

To facilitate the placing of the two projectors 4 at the aforementioned distance of each other, it is also possible to provide in the floor, on which the vehicle is to be driven between the two screen plates, a pair of recesses spaced a distance of approximately 3,600 to 4,200 mm. from each other and adapted to respectively receive the lower pointed end of the adjusting screws 12, so that in this way the portable projectors can be easily placed the desired distance from each other.

The adjustment of the two projectors 44 for the checking and aligning a pair of wheels on one axle of a vehicle proceeds preferably in the following manner. The housings 17 of the two projectors 4 are adjusted in vertical position on the support columns 13 and 14 so that the sets of objective lenses 31 thereof are substantially at the same height, corresponding to the height of the axle of the vehicle to be checked. After placing the lower ends of the adjusting screws 12 in the aforementioned recesses and after switching on the lamps 25, the projectors 4 are moved about the adjusting screw 12 located in the respective recess until the image of the vertical line of the reticle 29 of one projector is aligned with the ordinate 39 of the screen plate on the opposite projector. If the two vertical lines should not be completely parallel or aligned with each other, due to unevenness of the floor on which the projectors are mounted, it is possible to adjust the position thereof by means of the adjusting screws 10 and 11. By subsequently turning the adjusting screw 12 in the one or the other direction, the respective projector may be tilted about an axis passing through the bottom ends of the adjusting screws 10 and 11, in such a manner so as to adjust the elevation of the reticles thereof until the horizontal line of the reticle of one projector will be aligned with the abscissa 40 on the screen plate of the opposite projector.

The scale 28 is arranged in the housing of each projector 4 at such a distance from the set of objective lenses 31 thereof so that without any adjustment of the objective lenses, the scale reflected from an adjacent wheel mirror 2 of the respective projector on a vehicle driven between the projectors will be sharply focused on the screen plate 41. It is for this reason that the set of objective lenses are fixedly and nonadjustably mounted in the housing of the projector, assuring thereby a great accuracy of the apparatus. The light intensity provided by the iodine vapor lamp 25 is so great that in most of the cases, at least for the projection of the reflected scale onto the screen plate 41, a light intensity smaller than the maximum light intensity provided by the iodine vapor lamp is sufficient. In order to increase the useful life of the lamp 25, the lamp is connected to the network preferably by means of a circuit as, for instance, illustrated in FIG. 8a in which the socket 21, which is connected to the network, is connected over a two-pole switch 22 and a fuse s to the primary winding at the transformer 24, whereas the secondary winding of the transformer is provided with a tap and a selector switch 23 is provided in the circuit connecting the secondary winding of the transformer 24 to lamp 25 for selectively connecting one pole of the lamp to one end of the secondary winding or to the tap so as to operate the lamp 25 with the full voltage of the secondary winding or with a voltage which is about 10% smaller than the full voltage.

Figures 8A, 8B:
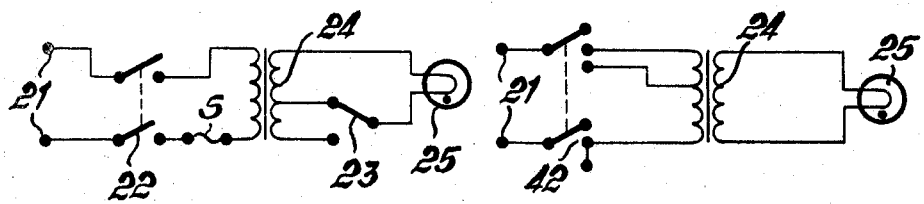
FIGS. 8a and 8b illustrate two wiring diagrams for the light source.

Instead of the arrangement shown in FIG. 8a, an arrangement as shown in FIG. 8b may also be used in which the secondary winding of the transformer is connected in a permanent manner to the lamp 25, whereas the primary winding of the transformer has a tap and a two-pole selector switch 42 between the socket 21 and the primary winding is used to connect the line voltage selectively to opposite ends of the primary winding of the transformer or to connect one pole of the network to one end of the primary winding and the other pole of the network to the tap of the primary winding.

Figure 4:
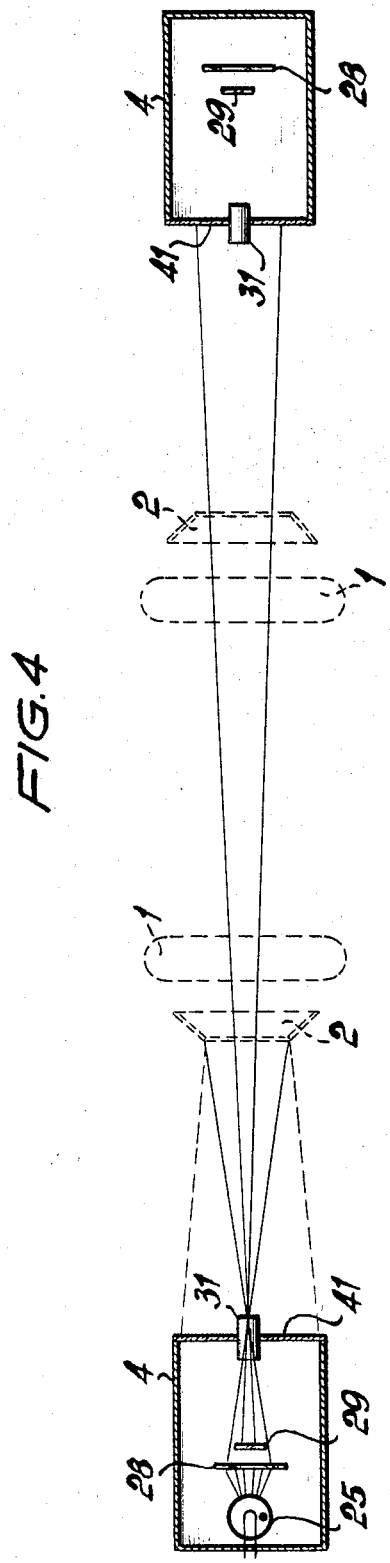
FIG. 4 is a schematic view of the arrangement of the two apparatus for measuring a pair of wheels on a common axle.
Figure 5:
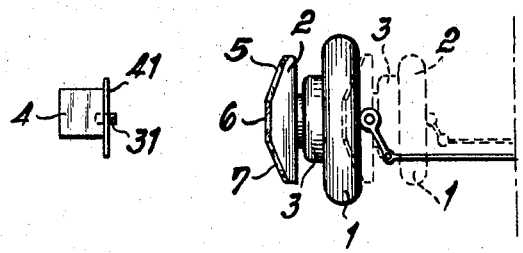
FIG. 5 is a schematic view illustrating the arrangement of one projector and showing the maximum and minimum spacing of the projector from a mirror attached to wheels of vehicles of different width.

The plates 41 are adjusted with respect to each other in the manner as described above, a vehicle, the wheels 1 thereof have to be checked and properly aligned, is driven between the two projectors 4 (as indicated in dotted lines in FIG. 4) until the axes of the wheels 1 are aligned with the optical axes of the two projectors. Each of the wheels 1 to be checked carries a mirror 2 connected to the wheel by a mirror holder 3. Each mirror 2, has in the usual manner, three mirror portions 5, 6 and 7, in which the two outer mirror portions 5 and 7 are inclined relative to the middle portion 6 at an angle of 20°. The mirror 2 is adjustably mounted by means of the mirror holder 3, of known construction, on the respective wheel.

In order to check whether the mirror 2 is mounted on the respective wheel 1 in such a manner that the middle portion 6 is normal to the axis of the wheel, the axle of the vehicle driven between the two projectors 4 is raised and each wheel is turned about its axis. If, during such turning, the position of the projected scale on the screen plate 41 does not change, the mirror 2 is properly mounted on the wheel. Otherwise, the position of the mirror 2 relative to the wheel has to be adjusted by means of the mirror holder 3 until the scale projected by the mirror onto the screen plate does ont move any longer during turning of the wheel.

After the two projectors 4 as well as the mirrors 2 on the wheels to be checked are properly adjusted in their aforementioned manner, the toe-in respectively the toe-out, the caster, and the camber of the wheels are checked with the apparatus of the present invention in a known manner.

As can be seen from FIGS. 9a and 9b, the scale means of each projector 4 of a pair of projectors used for checking the wheels on a common axle, have three scales, that is a first scale for reading the camber of the wheel to be checked, a second scale for reading the toe-in or the toe-out of the wheel, and a third scale for reading the caster of the wheel. The three scales of each projector are arranged in such a manner, that when the scales are placed with a corresponding vertical edge side by side, as indicated FIGS. 9a and 9b, the first and second scales will be mirror pictures of each other, whereas the third scale, indicating the caster of the wheel, on one of the projectors will be reversed in direction relative to the third scale on the other projector, that is the positive graduations which are arranged to one side of the zero mark of the third scale of one projector, are arranged on the other side of the zero mark of the third scale of the other projector. The scales as used in projectors according to the prior art are illustrated in FIGS. 10a and 10b. As illustrated in FIG. 11, it is necessary in using the scales according to the prior art, to change during the checking and adjusting of the wheels three times from one to the other side of the vehicle and to change the wheel inclination two times, whereas, as illustrated in FIG. 12, in using the scales according to the present invention, one has to change only twice from one to the other side and change the inclination of the wheels only once.

It will be understood that each of the elements described above, or two or more together, may also find a useful application in other types of arrangement for measuring angles.

While the invention has been illustrated and described as embodied in an arrangement for measuring angles, especially for measuring the angular position of the wheels of a motor vehicle, it is not intended to be limited to the details shown, since various modifications and structural changes may be made without departing in any way from the spirit of the present invention.

We claim:

1. An arrangement for measuring angles, especially for measuring the angular position of wheels of a motor vehicle comprising, in combination, at least one mirror on each wheel to be checked extending substantially normal to the axis of the respective wheel; a pair of portable projector means, each projector means including a base plate, a housing, upright support means fixed to said base plate and supporting said housing adjustably in vertical direction, a light source in said housing, a set of condenser lenses, a set of objective lenses spaced further from said light source than said set of condenser lenses and arranged with the latter in the path of light rays emanating from said light source for projecting the rays in the direction of said mirror, scale means and reticle means in said housing between said set of condenser lenses and said set of objective lenses with said reticle means located closer to said set of objective lenses than said scale means, said set of condenser and objective lenses, said scale means, and said reticle means being aligned with each other along an optical axis; said housing being formed with a wall having an opening for the passage of the light rays projected by said lenses; and a screen plate carried by said wall of said housing substantially normal to said base plate and having an aperture aligned with said opening and coordinates intersecting each other at said aperture on the side of said screen plate opposite said projector, whereby said pair of portable projector means may be placed on a floor adjacent the wheels of a motor vehicle in spaced facing relation so that an image of said reticle is formed on the screen plate of the oppositely disposed projector means in the absence of said mirror, and an image of said scale is reflected to the screen plate when said mirror is placed in the path of said rays for measuring the angular position of a pair of wheels on one axle.

2. An arrangement as set forth in claim 1, wherein said sets of condenser lenses and objective lenses, said reticle means and said scale means are arranged within said housing with respect to each other in such a manner that the image of the reticle projected by one projector means will be sharply focused on the screen plate of a second projector means spaced a predetermined distance in the order of 3,400 to 3,600 mm. from the one projector means so that the optical axis of the two projector means may be aligned with each other in the absence of a vehicle between said projector means, and in such a manner that the image of the scale of each projector means reflected by the corresponding mirror on the wheels of a vehicle located between said projector means onto the screen plate of the corresponding projector means will also be sharply focused.

3. An arrangement as set forth in claim 2, wherein said scale means and said reticle means each include a glass plate, one provided with a scale and the other with a reticle.

4. An arrangement as set forth in claim 2, wherein said reticle means and said scale means include a single relatively heavy glass plate provided on one face thereof with a scale and on the opposite face thereof with a reticle.

5. An arrangement as set forth in claim 2, wherein said light source is in the form of an iodine vapor lamp, and including mounting means in said housing and supporting said lamp adjustably in a direction transverse to said optical axis.

6. An arrangement as set forth in claim 5, wherein said lamp has a socket, and wherein said mounting means include a mounting plate carrying said socket, a cross beam extending through said housing fixed thereto, at least one head screw extending with a stem thereof through an opening in said mounting plate and screwed in a threaded bore in said cross beam, and spring means sandwiched between said cross beam and said mounting plate and biased to press said mounting plate against the head of said head screw.

7. An arrangement as set forth in claim 2, wherein said light source is in the form of an iodine vapor lamp, and including a transformer having a secondary winding provided with a tap intermediate its ends, a conductor connecting one end of said secondary winding with one pole of said lamp, and switch means for selectively connecting the other pole of said lamp with the other end of said secondary winding and with said tap.

8. An arrangement as set forth in claim 2, wherein said light source is in the form of an iodine vapor lamp, and including a transformer having a primary winding having a tap intermediate its ends and a secondary winding connected in circuit with said lamp, and switch means for selectively connecting one pole of a source of electric current to one end of said primary winding and to said tap, the other pole of said source of electric current being connected to the other end of said primary winding.

9. An arrangement as set forth in claim 2, wherein said scale means includes a first scale indicating the camber of the wheel to be checked, a second scale indicating the toe-in or the toe-out of the wheel, and a third scale indicating the caster of the wheel and wherein the scales in two projector means arranged for checking a pair of wheels on one axle are arranged in such an manner that the scales of the scale means of said pair of projector means when placed with a corresponding vertical edge side by side will be mirror pictures for said first and second scale, while the third scale of one projector will be reversed in direction with respect to the third scale of the other projector.

10. An arrangement for measuring angles, especially for measuring the angular position of wheels of a motor vehicle comprising, in combination, at least one mirror on each wheel to be checked extending substantially normal to the axis of the respective wheel; a pair of projector means, each projector means including a housing, a light source in said housing, a set of condenser lenses, a set of objective lenses spaced further from said light source than said set of condenser lenses and arranged with the latter in the path of light rays emanating from said light source for projecting the rays in the direction of said mirror, scale means and reticle means in said housing between said set of condenser lenses and said set of objective lenses with said reticle means located closer to said set of objective lenses than said scale means, said housing being formed in a wall thereof with an opening for the passage of the light rays projected by said lenses; and a screen plate carried by said wall of said housing and having an aperture aligned with said opening and coordinates intersecting each other at said aperture on the side of said screen plate opposite said projector whereby, when said pair of projector means are oppositely disposed in spaced facing relation, an image of said scale is reflected to said screen late when said mirror is placed in the path of said rays, and an image of said reticle is formed on the screen plate of the oppositely disposed projector means when said mirror is removed.

References Cited
UNITED STATES PATENTS

| | | | |
|---|---|---|---|
| 2,667,805 | 2/1954 | Carr | 88—14 |
| 2,700,319 | 1/1955 | Carr | 88—14 |
| 2,795,859 | 6/1957 | Buschbach | 88—14 X |
| 2,910,775 | 11/1959 | Müller et al. | 88—14 X |
| 3,288,020 | 11/1966 | Lill | 88—14 |

RONALD L. WIBERT, *Primary Examiner.*

J. ROTHENBERG, *Assistant Examiner.*

U.S. Cl. X.R.

33—46.2